(12) United States Patent  
Richardson

(10) Patent No.: US 9,080,565 B2  
(45) Date of Patent: Jul. 14, 2015

(54) ENERGY EXTRACTION SYSTEM

(71) Applicant: Aperia Technologies, South San Francisco, CA (US)

(72) Inventor: Brandon Richardson, South San Francisco, CA (US)

(73) Assignee: Aperia Techologies, Inc., Burlingame, CA (US)

(*) Notice: Subject to any disclaimer, the term of this patent is extended or adjusted under 35 U.S.C. 154(b) by 0 days.

(21) Appl. No.: 14/019,885

(22) Filed: Sep. 6, 2013

(65) Prior Publication Data

US 2014/0010680 A1 Jan. 9, 2014

Related U.S. Application Data

(63) Continuation of application No. 13/797,811, filed on Mar. 12, 2013.

(60) Provisional application No. 61/613,406, filed on Mar. 20, 2012, provisional application No. 61/637,206, filed on Apr. 23, 2012, provisional application No. 61/672,223, filed on Jul. 16, 2012.

(51) Int. Cl.
*F04B 9/04* (2006.01)
*F04B 49/08* (2006.01)
(Continued)

(52) U.S. Cl.
CPC .............. *F04B 49/08* (2013.01); *B60C 23/00* (2013.01); *B60C 23/001* (2013.01); *B60C 23/003* (2013.01); *B60C 23/12* (2013.01);
(Continued)

(58) Field of Classification Search
CPC ............ F04C 25/00; F04B 9/042; F04B 9/04; F04B 17/00; F04B 49/08; B60C 23/0023; B60C 23/12; B60C 23/00; B60C 23/001; B60S 3/047; F16F 15/1485; F16H 25/08; Y10T 74/2128; Y10T 74/2107
USPC ........... 417/211, 221, 231, 233; 152/419, 421
See application file for complete search history.

(56) References Cited

U.S. PATENT DOCUMENTS 1,358,524 A * 11/1920 Cooper .................... 152/421
1,448,248 A * 3/1923 Anthony .................. 152/421
(Continued)

FOREIGN PATENT DOCUMENTS

WO 2009034321 A 3/2009
WO 2009110001 A1 9/2009
WO 2012012617 A 1/2012

*Primary Examiner* — Peter J Bertheaud
*Assistant Examiner* — Dominick L Plakkoottam
(74) *Attorney, Agent, or Firm* — Jeffrey Schox; Diana Lin

(57) ABSTRACT

An energy extraction system for a rotational surface including a drive mechanism having a rotational axis and configured to rotatably couple to the rotational surface and an energy extraction mechanism coupled to the drive mechanism. The drive mechanism includes a cam rotatable about the rotational axis and an eccentric mass coupled to the cam that offsets a center of mass of the drive mechanism from the rotational axis, the eccentric mass cooperatively formed by a first and a second section, the eccentric mass operable between a connected mode wherein the first and second sections are adjacent and a disconnected mode wherein the first and second sections are separated. The energy extraction mechanism is connected to the cam and is statically coupled to the rotating surface, wherein the energy extraction mechanism configured to extract energy from relative rotation between the energy extraction mechanism and the cam.

20 Claims, 3 Drawing Sheets

(51) Int. Cl.
   *F16H 25/08*   (2006.01)
   *F04C 25/00*   (2006.01)
   *B60C 23/00*   (2006.01)
   *B60C 23/12*   (2006.01)
   *B60S 5/04*    (2006.01)
   *F04B 17/00*   (2006.01)
   *F16F 15/14*   (2006.01)

(52) U.S. Cl.
   CPC   *B60S 5/043* (2013.01); *F04B 9/04* (2013.01); *F04B 9/042* (2013.01); *F04B 17/00* (2013.01); *F04C 25/00* (2013.01); *F16F 15/1485* (2013.01); *F16H 25/08* (2013.01); *Y10T 74/2107* (2015.01); *Y10T 74/2128* (2015.01); *Y10T 137/86002* (2015.04)

(56) References Cited

U.S. PATENT DOCUMENTS

| | | | |
|---|---|---|---|
| 2,211,935 | A | 8/1940 | Parker |
| 2,899,907 | A | 8/1959 | Becher |
| 2,962,119 | A | 11/1960 | White |
| 3,012,820 | A | 12/1961 | King |
| 3,047,339 | A | 7/1962 | Hamer |
| 3,152,553 | A | 10/1964 | Sverker |
| 3,175,507 | A | 3/1965 | Sverker |
| 3,249,059 | A | 5/1966 | Renn |
| 3,400,074 | A | 9/1968 | Grenci |
| 3,452,801 | A * | 7/1969 | Fletcher et al. ............ 152/419 |
| 3,532,449 | A | 10/1970 | Garton |
| 3,730,215 | A | 5/1973 | Conery et al. |
| 3,886,974 | A | 6/1975 | Bjorklund |
| 3,981,633 | A | 9/1976 | Wall |
| 4,018,579 | A | 4/1977 | Hofmann |
| 4,030,300 | A | 6/1977 | Thompson |
| 4,095,923 | A | 6/1978 | Cullis |
| 4,121,472 | A | 10/1978 | Vural et al. |
| 4,157,530 | A | 6/1979 | Merz |
| 4,256,971 | A | 3/1981 | Griffith |
| 4,291,235 | A | 9/1981 | Bergey, Jr. et al. |
| 4,370,894 | A | 2/1983 | Sturesson |
| 4,460,006 | A | 7/1984 | Kolze |
| 4,536,668 | A | 8/1985 | Boyer |
| 4,606,710 | A | 8/1986 | Maguire |
| 4,637,152 | A | 1/1987 | Roy |
| 4,651,792 | A * | 3/1987 | Taylor ........................ 152/415 |
| 4,768,542 | A | 9/1988 | Morris |
| 4,807,487 | A | 2/1989 | Seidl |
| 4,819,593 | A | 4/1989 | Bruener et al. |
| 4,852,528 | A | 8/1989 | Richeson et al. |
| 4,893,459 | A | 1/1990 | Orlando |
| 4,895,199 | A | 1/1990 | Magnuson et al. |
| 4,910,148 | A | 3/1990 | Sorensen et al. |
| 4,922,984 | A | 5/1990 | Dosjoub et al. |
| 5,018,797 | A | 5/1991 | Takata |
| 5,052,456 | A | 10/1991 | Dosjoub |
| 5,173,038 | A | 12/1992 | Hopfensperger et al. |
| 5,201,968 | A | 4/1993 | Renier |
| 5,293,919 | A | 3/1994 | Olney et al. |
| 5,325,902 | A | 7/1994 | Loewe et al. |
| 5,342,177 | A | 8/1994 | Cheng |
| 5,370,711 | A | 12/1994 | Audit et al. |
| 5,375,984 | A | 12/1994 | Wehling |
| 5,388,470 | A | 2/1995 | Marsh, Jr. |
| 5,409,049 | A | 4/1995 | Renier |
| 5,413,159 | A | 5/1995 | Olney et al. |
| 5,429,927 | A | 7/1995 | Afseth et al. |
| 5,468,129 | A | 11/1995 | Sunden et al. |
| 5,482,447 | A | 1/1996 | Sunden et al. |
| 5,495,879 | A | 3/1996 | Cabestrero |
| 5,512,439 | A | 4/1996 | Hornes et al. |
| 5,525,493 | A | 6/1996 | Hornes et al. |
| 5,591,281 | A * | 1/1997 | Loewe ........................ 152/418 |
| 5,646,727 | A | 7/1997 | Hammer et al. |
| 5,707,215 | A | 1/1998 | Olney et al. |
| 5,759,820 | A | 6/1998 | Hornes et al. |
| 5,894,757 | A | 4/1999 | Sully |
| 5,941,692 | A | 8/1999 | Olney et al. |
| 5,941,696 | A | 8/1999 | Fenstermacher et al. |
| 6,092,545 | A | 7/2000 | Bedore et al. |
| 6,267,450 | B1 | 7/2001 | Gamble |
| 6,360,768 | B1 | 3/2002 | Galler |
| 6,463,798 | B2 | 10/2002 | Niekerk et al. |
| 6,474,832 | B2 | 11/2002 | Murray |
| 6,482,592 | B1 | 11/2002 | Lundeberg et al. |
| 6,494,693 | B1 | 12/2002 | Sunden |
| 6,742,386 | B1 | 6/2004 | Larson |
| 6,787,233 | B1 | 9/2004 | Molteberg et al. |
| 6,814,547 | B2 | 11/2004 | Childers et al. |
| 6,871,683 | B2 | 3/2005 | Cobb |
| 6,984,702 | B2 | 1/2006 | Fonnum et al. |
| 6,986,913 | B2 | 1/2006 | Fonnum et al. |
| 6,994,136 | B2 | 2/2006 | Stanczak |
| 7,117,731 | B2 | 10/2006 | Hrabal |
| 7,160,707 | B2 | 1/2007 | Fonnum et al. |
| 7,173,124 | B2 | 2/2007 | Deggerdal et al. |
| 7,217,762 | B1 | 5/2007 | Joergedal et al. |
| 7,222,487 | B1 | 5/2007 | Hinkley |
| 7,225,845 | B2 | 6/2007 | Ellmann |
| 7,237,590 | B2 | 7/2007 | Loewe |
| 7,255,323 | B1 | 8/2007 | Kadhim |
| 7,357,164 | B2 | 4/2008 | Loewe |
| 7,498,683 | B2 | 3/2009 | Landwehr |
| 7,506,663 | B2 | 3/2009 | Thomas et al. |
| 7,581,576 | B2 * | 9/2009 | Nakano ........................ 152/421 |
| 7,607,465 | B2 | 10/2009 | Loewe |
| 7,614,474 | B2 | 11/2009 | Yang |
| 7,625,189 | B2 | 12/2009 | Cheng |
| 7,704,057 | B2 | 4/2010 | Malbec et al. |
| 7,748,422 | B2 | 7/2010 | Bol |
| 7,763,689 | B2 | 7/2010 | Fonnum et al. |
| 7,784,513 | B2 | 8/2010 | Loewe |
| 7,810,582 | B2 | 10/2010 | Webb |
| 7,828,095 | B2 | 11/2010 | Murata et al. |
| 7,828,101 | B2 | 11/2010 | Radtke et al. |
| 7,847,421 | B2 | 12/2010 | Gardner et al. |
| 7,856,871 | B2 | 12/2010 | Mancosu et al. |
| 7,927,170 | B2 | 4/2011 | Bickerton et al. |
| 7,931,061 | B2 | 4/2011 | Gonska et al. |
| 7,931,817 | B2 | 4/2011 | Bilski |
| 7,975,789 | B2 | 7/2011 | Murata |
| 7,985,340 | B2 | 7/2011 | Almaasbak et al. |
| 7,989,614 | B2 | 8/2011 | Deggerdal et al. |
| 7,989,975 | B2 | 8/2011 | Clement et al. |
| 8,004,104 | B2 | 8/2011 | Hench |
| 8,022,561 | B2 | 9/2011 | Ciglenec et al. |
| 8,038,987 | B2 | 10/2011 | Fonnum et al. |
| 8,042,586 | B2 | 10/2011 | Losey et al. |
| 8,083,503 | B2 | 12/2011 | Voltenburg, Jr. et al. |
| 8,110,351 | B2 | 2/2012 | Bosnes |
| 8,113,254 | B2 | 2/2012 | Benedict |
| 8,747,084 | B2 | 6/2014 | Richardson et al. |
| 2004/0050760 | A1 | 3/2004 | Siegfriedsen |
| 2007/0018458 | A1 | 1/2007 | Martinez |
| 2007/0040135 | A1 | 2/2007 | Dyer et al. |
| 2007/0151648 | A1 | 7/2007 | Loewe |
| 2008/0247883 | A1 | 10/2008 | Yokomachi et al. |
| 2009/0301575 | A1 | 12/2009 | Arnett |
| 2010/0243121 | A1 | 9/2010 | Eigenbrode |
| 2011/0018275 | A1 | 1/2011 | Sidenmark |
| 2011/0061621 | A1 | 3/2011 | Finkenbiner |
| 2011/0308953 | A1 | 12/2011 | Bazant et al. |
| 2012/0020822 | A1 * | 1/2012 | Richardson et al. ........ 417/477.2 |
| 2013/0251553 | A1 | 9/2013 | Richardson et al. |
| 2014/0186195 | A1 | 7/2014 | Richardson et al. |

* cited by examiner

US 9,080,565 B2

ENERGY EXTRACTION SYSTEM

CROSS-REFERENCE TO RELATED APPLICATIONS

This application is a continuation of U.S. patent application Ser. No. 13/797,811, filed 12 Mar. 2013, which claims the benefit of U.S. Provisional Application No. 61/613,406 filed 20 Mar. 2012, U.S. Provisional Application No. 61/637,206 filed 23 Apr. 2012, and U.S. Provisional Application No. 61/672,223 filed 16 Jul. 2012, which are incorporated in its entirety by this reference.

TECHNICAL FIELD

This invention relates generally to the passive energy extraction field, and more specifically to a new and useful stabilizer in the passive energy extraction field.

BACKGROUND

In many applications, it is often desirable to passively extract energy from rotating systems, such as tires, windmills, or waterwheels. Some conventional systems harvest this energy by inducing relative motion between the rotating system and a stationary system having a center of gravity offset from the rotational axis. Examples of such systems can include pendulum systems or hanging mass systems (eccentric mass systems). However, conventional eccentric-mass driven systems, such as pendulum systems, experience instabilities when the rotating surface to which the eccentric mass is coupled receives outside stimulus (e.g. vibrations, bumps, rotational oscillations, etc.), particularly when the rotating surface rotates at the excitation frequency for the given eccentric mass. In response to an outside stimulus, the eccentric mass tends to rotate with the system, resulting in radial oscillations that can be detrimental to the energy extraction system or to the rotating surface to which the energy extraction system is coupled.

Thus, there is a need in the energy extraction field to create a new and useful energy extraction system having a stabilizing mechanism.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
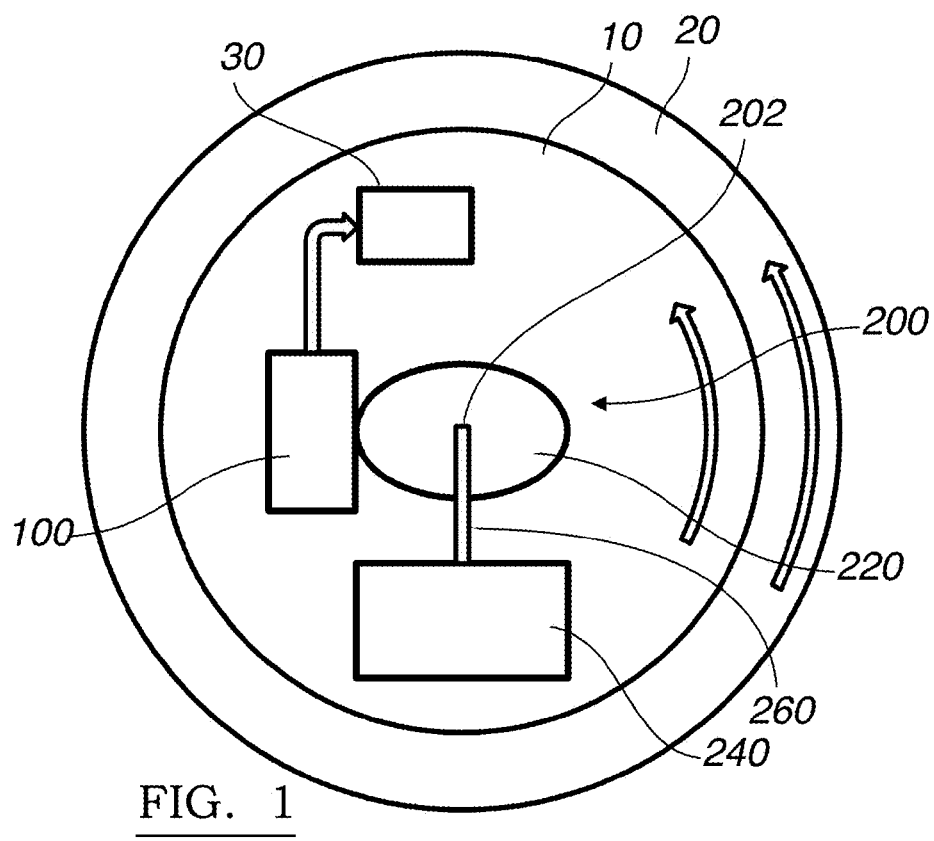
FIG. 1 is a schematic representation of an energy extraction system for a rotating surface.

As shown in FIG. 1, the energy extraction system 10 includes an extraction mechanism 100 and a drive mechanism 200 rotatably coupled to the extraction mechanism 100, the drive mechanism 200 including a cam 220 coupled to an eccentric mass 240. The energy extraction system 10 preferably functions to extract energy from relative motion between the energy extraction mechanism 100 and the drive mechanism 200. The energy extraction system 10 preferably couples to a rotating surface 20, wherein the extraction mechanism 100 is preferably statically coupled to the rotating surface 20 and wherein the eccentric mass 240 retains the cam angular position relative to a gravity vector while the extraction mechanism rotates relative to the drive mechanism 200 (e.g., with the rotating surface 20). The energy extraction system 10 is preferably passively controlled, but can alternatively be actively controlled, wherein the system further includes a power source, a plurality of sensors, and a controller that controls valve operation based on sensor measurements. The extraction mechanism 100 is preferably coupled to an energy storage device 30, such as a battery (e.g., wherein the extraction mechanism 100 extracts electrical power) or a fluid reservoir (e.g., wherein the extraction mechanism 100 extracts linear force).

The energy extraction system 10 is preferably couplable to a surface that rotates relative to a gravity vector (rotating surface 20). The rotating surface 20 is preferably a wheel of a vehicle, more preferably a truck, but can alternatively be any suitable rotating system, such as a windmill, waterwheel, or any other suitable rotating surface 20.

The extraction mechanism 100 of the energy extraction system 10 functions to extract energy from the relative motion between the cam 220 and the extraction mechanism 100. The extraction mechanism 100 is preferably configured to statically couple to and rotate with the rotating surface 20, but can alternatively be otherwise coupled to the rotating surface 20. The extraction mechanism 100 preferably rotates along an arcuate path exterior the cam 220, but can alternatively rotate along an arcuate path within the cam perimeters. The arcuate path of the extraction mechanism 100 is preferably centered about the rotational axis 202 of the drive mechanism 200, but can alternatively be otherwise positioned. The energy extraction system 10 preferably includes at least one extraction mechanism 100, but can alternatively include multiple extraction mechanisms, wherein the multiple extraction mechanisms are preferably substantially evenly distributed about the rotational axis 202 of the drive mechanism 200 at substantially the same radial distance, but can alternatively be otherwise positioned.

Figure 2:
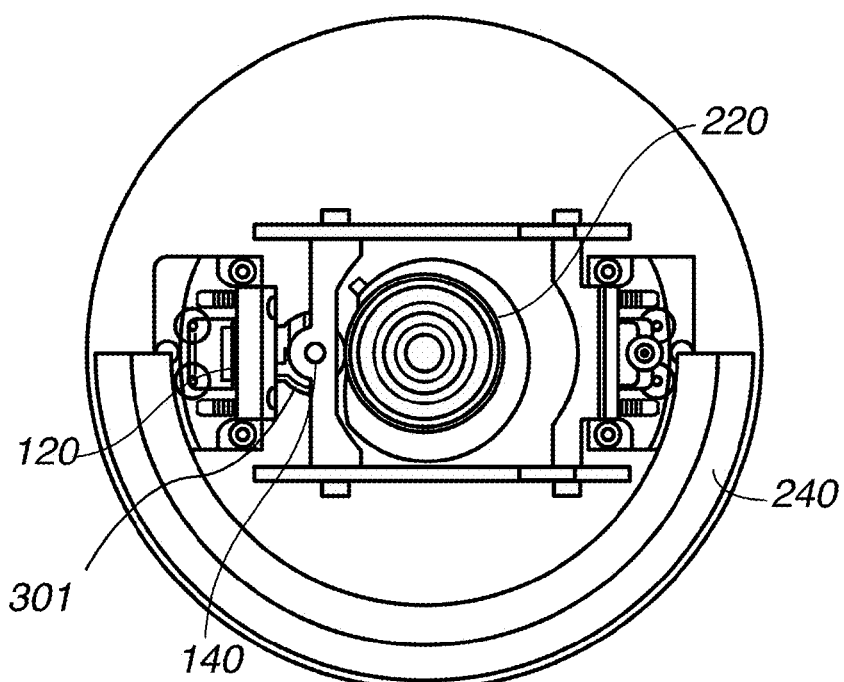
FIG. 2 is a schematic representation of a pump system utilizing a cam and eccentric mass.

In a first variation of the energy extraction system 10 as shown in FIG. 2, the extraction mechanism 100 includes a pump 120 and a force translator 140. The pump 120 is preferably a positive displacement pump, but can alternatively be any other suitable pump. The positive displacement pump 120 preferably includes a pump cavity and an actuating element that forms a fluid impermeable seal against the pump cavity and translates within the pump cavity to displace fluid. The positive displacement pump 120 is preferably a reciprocating pump (wherein a pump chamber is the pump cavity and a reciprocating element is the actuating element), but can alternatively be a peristaltic pump (wherein a groove is the pump cavity and a diaphragm or tube is the actuating element), such as that disclosed in U.S. application Ser. No. 13/187,949 filed 21 Jul. 2011, incorporated herein in its entirety by this reference, or any other suitable positive displacement pump. The reciprocating pump is preferably a piston pump, but can alternatively be a diaphragm pump, a diaphragm pump with a piston coupled to the diaphragm, or any other suitable reciprocating pump. The pump 120 is preferably coupled to the drive mechanism 200 a fixed radial distance away from the rotational axis 202, but can alternatively be coupled to the drive mechanism an adjustable radial distance away from the rotational axis 202, be coupled to the drive mechanism in the same plane or a different plane as the cam, or be coupled to the drive mechanism in any other suitable position. The pump 120 preferably includes a fluid inlet connected to a first reservoir and a fluid outlet connected to a second reservoir, wherein the pump 120 preferably pumps fluid from the first reservoir to the second reservoir. The pump 120 can additionally function to pressurize the fluid egressed into the second reservoir. The first reservoir is preferably the ambient environment, but can alternatively be a housing encompassing the drive mechanism 200 and the extraction mechanism 100 or any other suitable fluid source. The second reservoir is preferably a tire interior, but can alternatively be any other suitable fluid reservoir. The fluid inlet preferably includes an inlet valve that is in an open mode when the pressure within the pump 120 is substantially equal to or less than the pressure of the first reservoir and in a closed mode when the pressure within the pump 120 exceeds the pressure of the first reservoir, but can alternatively not include a valve or include any suitable number of valves. The fluid outlet preferably includes an outlet valve that is in an open mode when the pressure within the pump 120 is substantially equal to or more than the pressure of the second reservoir and in a closed mode when the pressure within the pump 120 is less than the pressure of the second reservoir, but can alternatively not include a valve or include any suitable number of valves. The inlet and outlet valves are preferably one-way passive valves, but can alternatively be active valves or any other suitable valves.

The force translator 140 functions to connect the pump 120 to the drive mechanism 200. More preferably, the force translator 140 functions to connect the actuating element to the cam 220, wherein the force translator 140 translates relative motion between the drive mechanism 200 and the pump 120 into a variable occluding force. The force translator 140 preferably applies a force in a radially outward direction from the rotational axis 202, but can alternatively apply a force in a radially inward direction, in a direction substantially parallel to the rotational axis 202, in a direction at an angle to the rotational axis 202, or in any other suitable direction. In a first alternative of the pump 120, the force translator 140 includes a planetary roller that rolls about an interior or exterior arcuate surface of the cam 220 (e.g., as disclosed in U.S. application Ser. No. 13/187,949, but alternatively any other suitable system can be used). This alternative is preferably used when the pump 120 is a peristaltic pump, but can alternatively be used for any other suitable pump system. In a second alternative of the pump 120, the force translator 140 is a roller 301 with a rotational axis 202 that is statically fixed to a point on the pump cavity, more preferably to the actuation axis of the pump 120. This alternative is preferably used with a reciprocating pump, but can alternatively be used with any other suitable pump 120. The roller is preferably in non-slip contact with a bearing surface of the cam 220, wherein the cam 220 preferably has a bearing surface with a varying curvature, such that the roller applies a variable force to the actuating element as the roller rolls over the variable bearing surface. The roller slides relative to the actuating element, but can alternatively be in contact with the actuating element in any other suitable manner. In a third alternative of the pump 120, the force translator 140 includes a linkage rotatably connected to a fixed point on the cam 220 and rotatably coupled to the actuating element, wherein the linkage preferably actuates the actuating element through a compression stroke and a recovery stroke as the fixed point nears and retreats from the pump cavity position, respectively. Alternatively, the linkage can actuate the actuating element through the compression stroke and recovery stroke as the fixed point retreats from and nears the pump cavity, respectively. The linkage preferably includes a single link, but can alternatively include two or more links rotatably connected at the respective ends. However, any other suitable force translator 140 can be used.

In a second variation of the energy extraction system 10, the extraction mechanism 100 includes an electromagnetic field and a conductive element. The motion of the conductive element through the applied electromagnetic field preferably generates a current, which is preferably subsequently stored or harvested by a load. The load is preferably electrically connected to the conductive element. The electromagnetic field is preferably an electric field, which is preferably generated by a first and a second electrode, wherein the first electrode is preferably held at an electric potential different from the second electrode. Alternatively, the electromagnetic field can be a magnetic field generated by one or more magnets. The conductive element can be a wire, wound wires, a rotor, a magnet, or any other suitable conductive element. The electric field preferably rotates with the rotating surface 20 (wherein the electrodes are statically coupled to the rotating surface 20), and the conductive element is preferably located on the cam 220. Alternatively, the electric field can be generated by the cam 220 (e.g., wherein the first electrode is located on the cam 220 and the second electrode located on a surface that is static relative to a gravity vector, wherein the first and second electrodes are located on opposing sides of the cam 220, wherein the extraction mechanism 100 is positioned within the cam perimeter, etc.), wherein the conductive element preferably rotates with the rotating surface 20.

In a third variation of the energy extraction system 10, the extraction mechanism 100 includes a force translator 140, similar to the one described above but alternatively can be any other suitable force translator 140, and a piezoelectric element that transforms the radial force applied by the force translator 140 into electricity.

However, any other suitable extraction mechanism 100 that extracts energy from the relative motion between the rotating surface 20 and the drive mechanism 200 can be used.

The drive mechanism 200 of the energy extraction system 10 functions to induce relative motion between the extraction mechanism 100 and the drive mechanism 200. The drive mechanism 200 preferably includes the cam 220 and the eccentric mass 240. The drive mechanism 200 includes a rotational axis 202 about which the drive mechanism 200 rotates relative to the extraction mechanism 100 (conversely, about which the extraction mechanism rotates relative to the drive mechanism 200). The rotational axis 202 of the drive mechanism 200 is preferably the rotational axis of the cam 220, but can alternatively be the rotational axis of the eccentric mass 240, the rotational axis about which the extraction mechanism rotates, or any other suitable rotational axis. The energy extraction system 10 is preferably configured such that the rotational axis of the drive mechanism 200 is substantially aligned with the rotational axis of the rotating surface 20 when the energy extraction system 10 is coupled to the rotating surface 20, but the energy extraction system 10 can alternatively be configured such that the rotational axis of the drive mechanism 200 is offset from the rotational axis 202 of the rotating surface 20. The drive mechanism 200 additionally includes a center of mass, determined from the mass and positions of the cam 220 and the eccentric mass 240. The eccentric mass 240 is preferably coupled to the cam 220 such that the center of mass of the drive mechanism 200 is offset from the rotational axis 202 of the drive mechanism 200.

The cam 220 of the drive mechanism 200 functions to interface with the extraction mechanism 100. In a first variation, the cam 220 includes an arcuate bearing surface that interfaces with the extraction mechanism 100. More preferably, the arcuate bearing surface interfaces with a roller force translator 140 of the extraction mechanism 100. In one alternative as shown in FIG. 2, the cam 220 includes a bearing surface with a variable curvature that controls the magnitude of the substantially linear, radial force applied to the extraction mechanism 100. The cam 220 preferably functions to provide a substantially constant torque against the reciprocating element throughout the compression stroke, but can alternatively provide a variable torque against the reciprocating element throughout the compression or recovery strokes. The cam 220 preferably includes a bearing surface, wherein the profile of the bearing surface preferably controls the magnitude of the force throughout the compression stroke. The bearing surface is preferably continuous, but can alternatively be discontinuous. The bearing surface is preferably defined on the exterior of the cam 220 (exterior bearing surface or outer bearing surface) but can alternatively be defined within the interior of the cam 220 (interior bearing surface or inner bearing surface), wherein the bearing surface defines a lumen within the cam 220. The bearing surface preferably arcuate, and preferably has a non-uniform curvature (e.g. an oblong or a reniform profile). Alternatively, the bearing surface can have a uniform curvature (e.g. a circular profile), an angular profile, or any other suitable profile. The bearing surface preferably includes a compression portion and a recovery portion, corresponding to the compression stroke and the recovery stroke of the extraction mechanism 100, respectively. The compression portion is preferably continuous with the recovery section, but can alternatively be discontinuous. The bearing surface preferably has a first section having a high curvature (preferably positive curvature or convex but alternatively negative curvature or concave) adjacent a second section having low curvature (e.g., substantially flat or having negative curvature compared to the first section). The bearing surface preferably additionally includes a third section connecting the first and second sections, wherein the third section preferably provides a substantially smooth transition between the first and second sections by having a low curvature adjacent the first section and a high curvature adjacent the second section. The compression portion preferably begins at the end of the second section distal the first section, extends along the third section, and ends at the apex of the first section. The compression portion is preferably convex (e.g., when the bearing surface is an external bearing surface), but can alternatively be concave. The apex of the first section preferably corresponds to the top of the compression stroke (compressed position). The recovery portion preferably begins at the apex of the first section, extends along the second section, and ends at the end of the second section distal the first section. The recovery portion is preferably substantially flat or concave (e.g., when the bearing surface is an external bearing surface), but can alternatively be convex. The end of the second section preferably corresponds to the bottom of the recovery stroke (recovered position). The slope of the compression portion is preferably less than 30 degrees, but can alternatively have any suitable angle. When a roller is used as the force translator 140, the curvature of the bearing surface is preferably at least three times larger than the roller curvature or roller diameter, but can alternatively be larger or smaller. However, the bearing surface can have any suitable profile. The cam 220 is preferably substantially planar with the bearing surface defined along the side of the cam, in a plane normal to the rotational axis of the cam (e.g., normal the broad face of the cam). The bearing surface is preferably defined along the entirety of the cam side, but can alternatively be defined along a portion of the cam side. The generated pump force is preferably directed radially outward of the rotational axis 202, more preferably along a plane normal to the rotational axis 202. Alternatively, the cam 220 can have a rounded or otherwise profiled edge segment (transition between the cam broad face and the cam side), wherein the bearing surface can include the profiled edge. Alternatively, the arcuate surface is defined by a face of the cam 220 parallel to the rotational axis of the cam 220, wherein the generated pump force can be directed at any suitable angle relative to the rotational axis 202, varying from parallel to the rotational axis to normal to the rotational axis. The compression portion preferably encompasses the majority of the cam profile, but can alternatively encompass half the cam profile or a small portion of the cam profile. In one variation, the compression portion covers 315 degrees of the cam profile, while the recovery portion covers 45 degrees of the cam profile. However, the compression and recovery portions can cover any other suitable proportion of the cam profile.

In another alternative, the cam 220 is a disk with a substantially circular profile. In yet another alternative, the cam 220 is a sphere segment or catenoid, wherein the bearing surface is preferably defined along the arcuate surface. In yet another alternative, the cam 220 is a bearing rotatably coupled about an axle statically coupled to the rotating surface 20. The cam 220 can alternatively have any other suitable form factor or configuration.

The eccentric mass 240 (hanging mass) of the drive mechanism 200 functions to offset the center of mass of the drive mechanism 200 from the rotational axis 202 of the drive mechanism 200. This offset can function to substantially retain the angular position of the cam 220 relative to a gravity vector, thereby engendering relative motion between the drive mechanism 200 and the extraction mechanism 100 statically coupled to the rotating surface 20 (that rotates relative to the gravity vector). The eccentric mass 240 is preferably a substantially homogenous piece, but can alternatively be heterogeneous. The eccentric mass 240 is preferably a distributed mass (e.g., extends along a substantial portion of an arc centered about the rotational axis 202, as shown in FIG. 2), but can alternatively be a point mass. The eccentric mass 240 is preferably curved, but can alternatively be substantially flat, angled, or have other suitable shape. The radius of the eccentric mass curvature is preferably maximized, such that the eccentric mass 240 traces an arcuate section of the energy extraction system perimeter. However, the eccentric mass 240 can have any other suitable curvature. The eccentric mass 240 preferably extends at least 90 degrees about the rotational axis 202 of the drive mechanism 200, more preferably 180 degrees about the rotational axis 202, but can extend more or less than 180 degrees about the rotational axis 202. The eccentric mass 240 preferably has substantially more mass than the cam 220, but can alternatively have a substantially similar mass or a smaller mass. The eccentric mass 240 preferably imparts 2 in-lb (0.225 Nm) of torque on the cam 220, but can alternatively impart more or less torque.

The eccentric mass 240 is preferably a separate piece from the cam 220, and is preferably coupled to the cam 220 by a mass couple 260. The eccentric mass 240 can be statically coupled to the cam 220 or rotatably coupled to the cam 220. In the variation wherein the eccentric mass 240 is statically coupled to the cam 220, the eccentric mass 240 can be coupled to the cam 220 at the rotational axis of the cam 220, at the rotational axis 202 of the drive mechanism 200, offset from the rotational axis of the cam 220, or at any other suitable portion of the cam 220. The eccentric mass 240 can be permanently connected to the cam 220. Alternatively, the eccentric mass 240 can be transiently connected (removably coupled) to the cam 220, wherein the eccentric mass 240 can be operable between a coupled mode wherein the eccentric mass 240 is coupled to the cam 220 and a decoupled mode wherein the eccentric mass 240 is rotatably coupled to the cam 220 or otherwise decoupled from angular cam 220 motion. The mass couple 240 preferably has a high moment of inertia, but can alternatively have a low moment of inertia. The mass couple 240 is preferably a disk, but can alternatively be a lever arm, plate, or any other suitable connection. The mass couple 240 preferably couples to the broad face of the cam 220, but can alternatively couple to the edge of the cam 220, along the exterior bearing surface of the cam 220, to the interior bearing surface of the cam 220, to an axle extending from the cam 220 (wherein the cam 220 can be statically fixed to or rotatably mounted to the axle), or to any other suitable portion of the cam 220. The mass couple 240 can couple to the cam 220 by friction, by a transient coupling mechanism (e.g., complimentary electric or permanent magnets located on the cam 220 and mass couple 260, a piston, a pin and groove mechanism, etc.), by bearings, or by any other suitable coupling means.

Figure 3A:
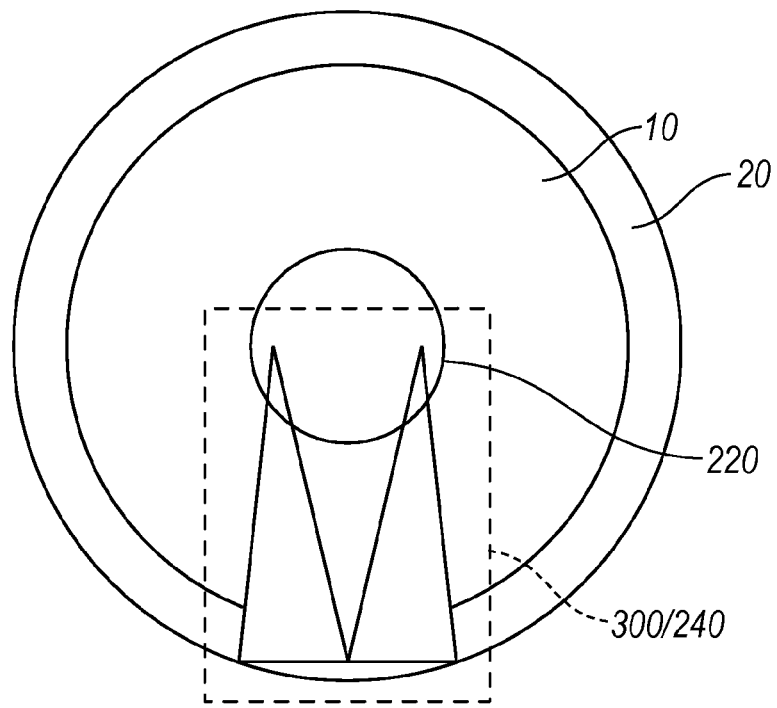
FIGS. 3A and 3B are schematic representations of a variation of the stabilizing mechanism in the cohesive state and the separated state, respectively.
Figure 3B:
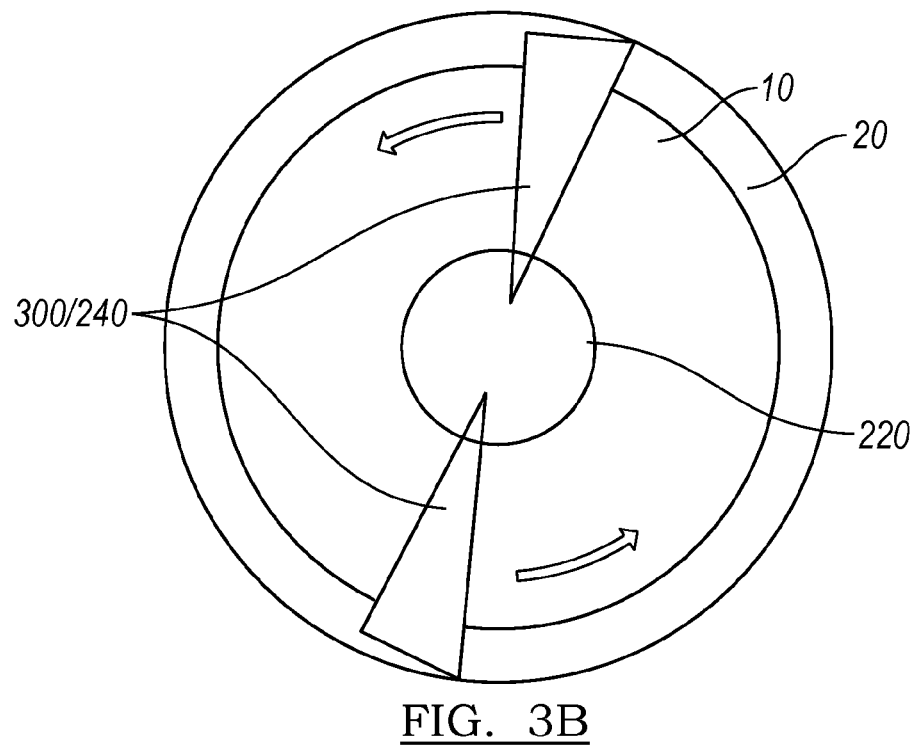
Figure 4A:
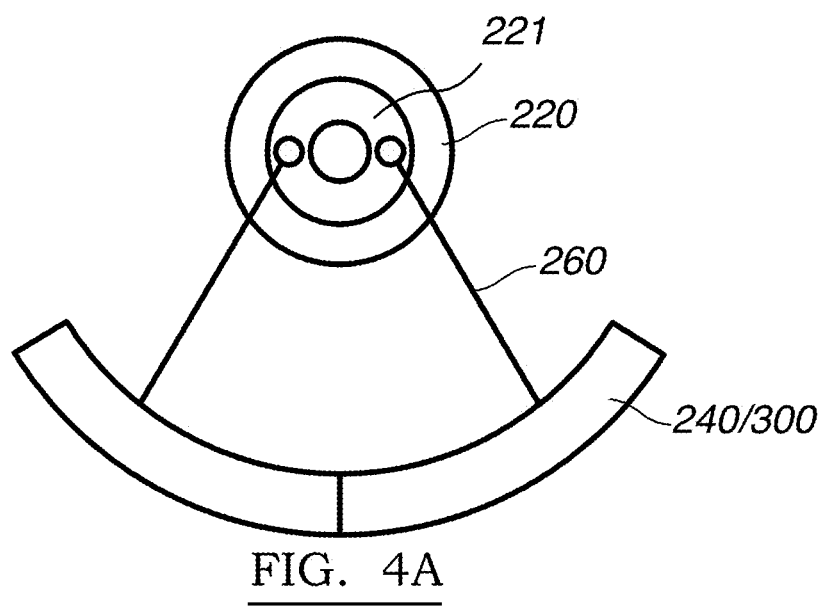
FIGS. 4A and 4B are schematic representation of a second variation of the stabilizing mechanism in the cohesive state and the separated state, respectively.
Figure 4B:
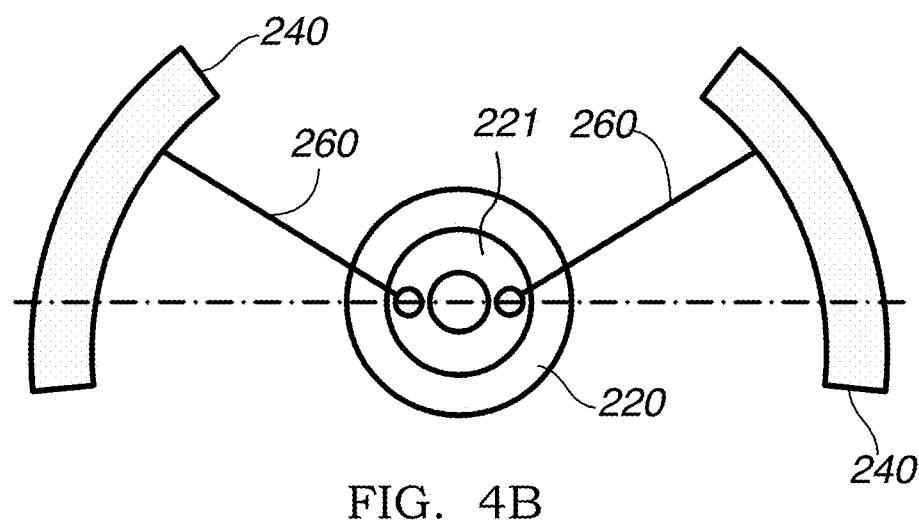

The energy extraction system 10 can additionally include a stabilizing mechanism 300 that functions to reduce rotational surface imbalance when the eccentric mass 240 becomes excited (e.g., begins spinning) when the energy extraction system 10 receives a destabilizing force and the eccentric mass becomes excited (e.g., rotates about the axis of rotation for the system). Eccentric mass excitation can destabilize the rotational surface, potentially leading to catastrophic energy extraction system and/or rotating surface damage. The inventors have discovered that the system can be stabilized at the excitation frequency by using an eccentric mass 240 that is collectively formed from multiple sections (e.g., wherein the eccentric mass 240 is the stabilizing mechanism 300). When the rotating system rotates at frequencies less than the excitation frequency and/or does not receive a destabilizing force, the eccentric mass 240 is preferably in a cohesive state (connected mode), with all composite sections of the eccentric mass 240 substantially adjacent (e.g., as shown in FIGS. 3A and 4A). When the eccentric mass 240 begins to spin, the composite sections of the eccentric mass 240 separate in opposing directions and spin about the axis of rotation, eventually settling at the separated state (disconnected mode, e.g., as shown in FIGS. 3B and 4B). This is particularly useful when system oscillations cause the eccentric mass 240 (and mass couple 260) to spin about the shaft; the centrifugal forces cause the sections of the split eccentric mass to separate and be evenly distributed about the axis of system rotation. Not only does this have the effect of dynamically balancing the system and/or rotating surface 20, but the even distribution of the eccentric mass 240 within the system also halts system pumping. The latter effect may allow the eccentric mass 240 to additionally function as a control mechanism, wherein the eccentric mass resonant frequency may be tailored such that pumping is ceased when a predetermined rotation speed or vibration frequency is reached. The multiple sections are preferably each positioned the same radial distance away from the rotational axis 202 (the eccentric mass 240 is radially divided into multiple sections, wherein the multiple sections have different angular positions), but can alternatively be positioned at different radial distances (e.g., wherein the multiple sections have substantially similar angular positions, etc.). The multiple sections preferably share a common plane, wherein the common plane is preferably substantially parallel to the rotational surface. The multiple sections can collectively form an arc, centered about the rotational axis 202, that intersects the common plane (e.g., the multiple sections are adjacent along an arc), form a block that intersects the common plane, or collectively form any other suitable structure. Alternatively, the multiple sections can be stacked along the thicknesses of the sections, wherein the section thicknesses are preferably parallel to the rotational axis 202. The multiple sections preferably have substantially the same mass, but can alternatively have different masses. The center of mass for each eccentric mass section is preferably offset from the mass couple connection point for each eccentric mass section, and is preferably arranged proximal an adjacent eccentric mass section. In operation, the eccentric mass sections separate until the centers of mass of the eccentric mass sections oppose each other across the axis of rotation.

When the eccentric mass 240 is cooperatively formed by multiple sections, the mass couple 240 preferably also includes multiple sections, wherein each mass couple section statically couples to an eccentric mass section. The mass couple sections are preferably rotatably coupled to the cam 220, but can alternatively be statically coupled to the cam 220. Each mass couple section is preferably rotatably coupled to the remaining mass couple sections, but can alternatively be statically coupled to one or more of the remaining mass couple sections. In one variation as shown in FIGS. 4A and 4B, the end of each mass couple section opposing the eccentric mass section is rotatably coupled to the housing. The angular positions of mass couple section ends are preferably static relative to the housing, wherein the mass couple section ends are preferably equally distributed about the axis of rotation. In another variation, the end of the each mass couple section opposing the eccentric mass section includes a bearing, wherein the bearing is slidably engaged within a circumferential groove statically coupled to the cam 220 and encircling the rotational axis 202. When the rotation frequency of the rotating surface 20 is below or above the excitation frequency for the cooperatively defined eccentric mass 240, the centrifugal force of the rotation preferably retains the eccentric mass sections (and mass couple sections) in substantially adjacent positions. When the rotation frequency of the rotating surface 20 is at the excitation frequency, the centrifugal force preferably causes the bearings to slide within the groove, distributing the multiple eccentric mass sections substantially equally about the rotational axis 202. The bearings and/or the eccentric mass sections can each additionally include magnets, disposed in repulsive relation to adjacent magnets, which facilitate eccentric mass separation in response to the receipt of a system oscillation. In another variation, the mass couple sections rotatably couple along the longitudinal axis of an axle extending from the cam 220 (e.g., mass couple sections are stacked along the axle). In another variation, one mass couple section is statically connected to the cam 220 while the remaining mass couple sections are rotatably connected to the cam 220. However, the mass couple sections can be otherwise connected to the cam 220.

When the mass couple 260 couples to the cam 220 at the rotational axis 202, the mass couple 260 is preferably operable between the coupled mode, wherein the mass couple 260 connects the eccentric mass 240 to the cam 220, and the decoupled mode, wherein the mass couple 260 disconnects the eccentric mass 240 from the cam 220. In one variation, the mass couple 260 is a disk located within the lumen defined by an interior bearing surface of the cam 220, wherein the disk can rotate relative to the interior bearing surface in the decoupled mode and is coupled to the interior bearing surface by a friction element in the coupled mode. The mass couple sections are preferably rotatably coupled to the disk, but can alternatively be disk sections (e.g., concentric circles, arcuate pieces, etc.). The friction element can be a high-friction coating along the interior bearing surface, a high-friction coating along the mass couple 260 exterior, a roller or wedge, or any other suitable element capable of providing friction between the interior bearing surface and the mass couple 260. The friction element is preferably selected such that the cooperative centrifugal force of the eccentric mass 240 in the coupled mode applies sufficient force to the mass couple 260 such that the friction between the mass couple 260 and the interior bearing surface retains the mass couple position relative to the cam 220. The friction element is preferably selected such that the cooperative centrifugal force of the eccentric mass sections in a separated or decoupled mode does not provide enough force for interface friction to retain the mass couple position relative to the cam 220, thereby allowing free mass couple 260 rotation. In another variation, the mass couple 260 is rotatably mounted on an axle extending from the cam 220 by bearings, wherein the mass couple 260 can be statically coupled to the cam 220 by one or more sets of magnets or pistons extending from the adjacent broad faces of the cam 220 and mass couple 260. However, the static mass couple connection to the cam 220 to achieve the coupled mode can be selectively controlled by any other suitable passive or active means.

The eccentric mass 240 can additionally include a connection mechanism that functions to couple the multiple sections together. The mass connectors are preferably located on the interfaces of adjacent sections, but can alternatively be located within the section bodies, at the interfaces of adjacent mass couple sections, or at any other suitable location. The coupling force of the connection mechanism is preferably selected such that it is substantially equal to or lower than the angular separation force experienced by the individual eccentric mass sections when the system is rotating at the excitation frequency. However, the coupling force can have any other suitable magnitude. The connection mechanism can be a mechanical connection (e.g., adhesive, clips, Velcro, etc.) with a separation force substantially equivalent to the coupling force, a magnetic connection wherein adjacent eccentric mass or mass couple sections include complimentary magnets, or any other suitable mechanism that can selectively connect adjacent eccentric mass sections together.

In one alternative, the eccentric mass 240 is collectively formed by a first and a second section as shown in FIGS. 3A and 3B (e.g., the eccentric mass 240 is divided radially into two sections), wherein the first section is a reflected duplication of the second section. In operation, the first and second sections are preferably diametrically opposed and spin about the axis of rotation of the positioning mechanism when the system vibration reaches the resonance frequency of the eccentric mass 240. In a second alternative, the eccentric mass 240 is collectively formed by a first, second, and third section with substantially the same mass, wherein the first, second and third sections are preferably substantially evenly distributed about the rotational axis 202 when the system rotational speed reaches the resonance frequency of the eccentric mass 240. However, the eccentric mass 240 may be formed from any number of constituent sections in any suitable configuration. Alternatively, the stabilizing mechanism 300 may be any other suitable mechanism.

The energy extraction system 10 can additionally include a damping mechanism that functions to minimize oscillations of the eccentric mass 240 within the system. Oscillations of the eccentric mass 240 may result in eccentric mass excitation, wherein the eccentric mass 240 spins within the system instead of remaining substantially static relative to a gravity vector. Oscillations may arise from irregularities in the rolling surface (e.g., the road), dynamic unbalance (e.g., due to wheel mass distribution), the pumping pulse (e.g., when the pumping pulse occurs at an frequency that excites the mass), or may arise from any suitable mechanism that may generate oscillations of the eccentric mass 240.

In a first variation, the damping mechanism includes Dynabeads or other dynamic balancing mechanisms located within an internal channel 221 encircling the rotational axis 202. In a second variation, the damping mechanism is a torsional mass-spring system, wherein the resonant vibration period of the mass-spring system is preferably matched to the gravitationally induced resonant frequency of the eccentric mass oscillation. The torsion spring is preferably coupled to the cam 220 such that the eccentric mass oscillations cause an inertial transfer, which excites the torsional mass-spring system into resonance at a phase shift that is 180 degrees out of phase with the oscillations of the eccentric mass 240. The torsion spring is preferably coupled between the torsional mass and the cam 220, but may alternatively be positioned between the cam 220 and the mass couple 260, or in any suitable position.

As a person skilled in the art will recognize from the previous detailed description and from the figures and claims, modifications and changes can be made to the preferred embodiments of the invention without departing from the scope of this invention defined in the following claims.

I claim:

1. A tire inflation system configured to mount to a wheel, the wheel having a rotational axis, the inflation system comprising:
   a drive mechanism that rotatably mounts to the wheel, the drive mechanism comprising:
   a channel that encircles the rotational axis;
   multiple masses movably contained within the channel, the multiple masses operable between: a pumping mode, wherein the masses are arranged in a pumping configuration; and a non-pumping mode, wherein the masses are arranged in a non-pumping configuration;
   a pumping mechanism that statically mounts to the wheel and fluidly connects to a tire interior, the pumping mechanism comprising an actuating element and a chamber; and
   a force translation mechanism statically connected to the channel, the force translation mechanism configured to transform a relative rotation between the drive mechanism and the pumping mechanism during the pumping mode into actuating element reciprocation.

2. The system of claim 1, wherein the masses translate within the channel between the pumping mode and the non-pumping mode.

3. The system of claim 2, wherein the masses are rotating elements that rotate within the channel to transition between the pumping mode and the non-pumping mode.

4. The system of claim 3, wherein the masses comprise beads.

5. The system of claim 1, wherein the masses are aggregated in a section of the channel in the pumping configuration, and are distributed along the channel in the non-pumping configuration.

6. The system of claim 1, wherein the force translation mechanism comprises a cam rotatably connected to the pumping mechanism.

7. The system of claim 6, wherein the cam comprises an arcuate bearing surface having a non-uniform curvature.

8. The system of claim 7, wherein the actuating element is movably coupled to the arcuate bearing surface.

9. The system of claim 7, further comprising a roller rotatably coupled between the arcuate bearing surface and the pumping mechanism, the roller comprising a rotational axis in fixed relation to actuating element.

10. An energy extraction system configured to mount to a rotating surface having a rotational axis, the system comprising:
   an eccentric mass comprising:
      a channel that encircles the rotational axis; and
      multiple masses enclosed within the channel, the multiple masses capable of translating between a pumping configuration and a non-pumping configuration,
   a pumping mechanism rotatably coupled to the eccentric mass, the pumping mechanism comprising a piston and a chamber; and
   a force translation mechanism statically connected to the channel, the force translation mechanism configured to transform a relative rotation between the eccentric mass in the pumping configuration and the pumping mechanism into piston reciprocation.

11. The system of claim 10, wherein the channel is centered about the rotational axis, wherein a center of mass of the eccentric mass is offset from the rotational axis in the pumping configuration, and is substantially centered about the rotational axis in the non-pumping configuration.

12. The system of claim 11, wherein the multiple masses are aggregated in a section of the channel in the pumping configuration and are distributed about the channel in the non-pumping configuration.

13. The system of claim 12, wherein the distribution of the multiple masses about the channel in the non-pumping configuration substantially opposes destabilizing forces applied to the rotating surface.

14. The system of claim 10, wherein the masses roll within the channel between the pumping configuration and the non-pumping configuration.

15. The system of claim 14, wherein the masses comprise spheres.

16. The system of claim 10, wherein the force translation mechanism comprises an arcuate bearing surface with varying curvature that interfaces with the piston of the pumping mechanism.

17. The system of claim 16, wherein the force translation mechanism comprises a cam statically connected to the eccentric mass and rotatably coupled to the pumping mechanism, the cam connected to the eccentric mass at a cam rotational axis.

18. The system of claim 17, wherein the non-uniform arcuate bearing surface is an exterior bearing surface of the cam.

19. The system of claim 16, wherein the system further comprises a roller arranged to roll along the arcuate bearing surface, the roller comprising a roller rotational axis fixed to the piston.

20. The system of claim 10, wherein the rotating surface is a wheel having a tire, wherein the pumping mechanism is fluidly connected to a tire interior.

* * * * *